(12) United States Patent
Kwon et al.

(10) Patent No.: US 10,647,853 B2
(45) Date of Patent: May 12, 2020

(54) COLORANT, COLORED RESIN COMPOSITION COMPRISING THE SAME, AND COLOR FILTER

(71) Applicant: LG DISPLAY CO., LTD., Seoul (KR)

(72) Inventors: Jihee Kwon, Anyang-si (KR); Seunghoon Ji, Changwon-si (KR)

(73) Assignee: LG DISPLAY CO., LTD., Seoul (KR)

( * ) Notice: Subject to any disclaimer, the term of this patent is extended or adjusted under 35 U.S.C. 154(b) by 302 days.

(21) Appl. No.: 15/720,970

(22) Filed: Sep. 29, 2017

(65) Prior Publication Data
US 2018/0094141 A1    Apr. 5, 2018

(30) Foreign Application Priority Data

Sep. 30, 2016   (KR) .................. 10-2016-0126544

(51) Int. Cl.
| | |
|---|---|
| *C09D 11/037* | (2014.01) |
| *C09D 11/102* | (2014.01) |
| *C09D 11/106* | (2014.01) |
| *C09D 11/107* | (2014.01) |
| *C09D 11/322* | (2014.01) |
| *C09D 11/38* | (2014.01) |
| *C09B 25/00* | (2006.01) |
| *C09B 47/08* | (2006.01) |
| *C09B 47/10* | (2006.01) |
| *C09B 67/22* | (2006.01) |
| *C08K 3/013* | (2018.01) |
| *C08L 33/08* | (2006.01) |
| *C09B 67/46* | (2006.01) |
| *G02B 5/22* | (2006.01) |

(52) U.S. Cl.
CPC .......... *C09B 67/0035* (2013.01); *C08K 3/013* (2018.01); *C09B 25/00* (2013.01); *C09B 47/085* (2013.01); *C09B 47/10* (2013.01); *C09B 67/009* (2013.01); *C09B 67/0034* (2013.01); *C08L 33/08* (2013.01); *G02B 5/223* (2013.01)

(58) Field of Classification Search
None
See application file for complete search history.

(56) References Cited

U.S. PATENT DOCUMENTS

| | | | | |
|---|---|---|---|---|
| 2004/0237842 A1* | 12/2004 | Hall-Goulle | ........ | C09B 67/0022 106/413 |
| 2006/0098316 A1* | 5/2006 | Tatsuzawa | ........ | G02F 1/133516 359/891 |
| 2006/0118001 A1* | 6/2006 | Sato | .................... | C09B 67/0009 106/412 |
| 2008/0081280 A1* | 4/2008 | Deno | .................... | C08K 5/0041 430/270.1 |
| 2009/0152514 A1* | 6/2009 | Takiguchi | ........... | C09B 67/0002 252/582 |
| 2010/0271569 A1* | 10/2010 | Ohkuma | ................ | G02B 5/201 349/70 |
| 2012/0154944 A1* | 6/2012 | Kanna | ..................... | C09B 57/10 359/891 |
| 2013/0137039 A1* | 5/2013 | Cho | ....................... | G03F 7/0007 430/285.1 |
| 2013/0235311 A1* | 9/2013 | Onaka | .................... | G02B 5/201 349/108 |
| 2014/0374677 A1* | 12/2014 | Osada | ................. | C09B 67/0033 252/586 |
| 2016/0177100 A1* | 6/2016 | Mochizuki | .............. | C09B 48/00 428/195.1 |
| 2016/0326348 A1* | 11/2016 | Aoyagi | ................ | C09B 47/0671 |
| 2016/0327710 A1* | 11/2016 | Murakami | ............. | G02B 5/201 |
| 2017/0009075 A1* | 1/2017 | Sakamoto | .............. | G02B 5/201 |
| 2017/0299961 A1* | 10/2017 | Sakamoto | .............. | C09B 47/10 |

FOREIGN PATENT DOCUMENTS

| | | |
|---|---|---|
| CN | 103135343 A | 6/2013 |
| CN | 103460086 A | 12/2013 |
| EP | 2489702 A1 * | 8/2012 |
| JP | 2013-186149 A | 9/2013 |
| JP | 2014-26228 A | 2/2014 |
| JP | 2014-85562 A | 5/2014 |
| JP | 2014-199308 A | 10/2014 |
| JP | 2014-208758 A | 11/2014 |
| KR | 10-2005-0025658 A | 3/2005 |
| KR | 10-2016-0112368 A | 9/2016 |
| KR | 10-2016-0112474 A | 9/2016 |

OTHER PUBLICATIONS

English translation CN 103460086, Dec. 2013; 254 pages.*
English translation KR 2016/0112474, Sep. 2016; 11 pages.*
Pigment Yellow 138, www.chemspider.com/Chemical-Structure.4576475.html, no date available; 3 pages.*
Pigment Green 7, www.chemspider.com/Chemical-Structure.17215355.html, no date available; 3 pages.*
Pigment Green 36, www.chemspider.com/Chemical-Structure.55627.html, no date available; 3 pages.*

* cited by examiner

*Primary Examiner* — Helene Klemanski
(74) *Attorney, Agent, or Firm* — Birch, Stewart, Kolasch & Birch, LLP

(57) ABSTRACT

The present invention relates to a colorant, a colored resin composition comprising the colorant, and a color filter prepared using the colored resin composition. A novel reddish yellow pigment may be used in combination with a green pigment and a yellow pigment in order to reduce the imbalance of the intramolecular polarization of the green pigment and/or the yellow pigment in the colorant. As a result, a color filter comprising a colored layer in which a light leakage phenomenon, caused by an electric field distortion, is reduced.

18 Claims, No Drawings

COLORANT, COLORED RESIN COMPOSITION COMPRISING THE SAME, AND COLOR FILTER

CROSS-REFERENCE TO RELATED APPLICATION

The present application claims the priority benefit of Patent Application No. 10-2016-0126544, filed in the Republic of Korea on Sep. 30, 2016, which is hereby incorporated by reference in its entirety into the present application.

BACKGROUND OF THE INVENTION

Field of the Invention

The present invention relates to a colorant, a colored resin composition comprising the colorant, and a color filter prepared using the colored resin composition.

Description of the Related Art

In recent display devices (e.g., liquid crystal display devices, organic light-emitting display devices, or imaging devices), a color filter is used to provide colors to images that are displayed or generated. The color filter is prepared by dispersing a suitable pigment corresponding to red, green and blue in a solvent containing a binder, and applying the pigment dispersion to a desired position to form a colored cured layer.

To increase the quality of images that are displayed or generated by display devices or imaging devices, a color filter having excellent characteristics, such as contrast, brightness and color gamut is required.

When a color filter having a low contrast ratio is used, a problem occurs in that polarization controlled by liquid crystals is scattered. As a result, light leaks out in the off-state, the amount of transmitted light in the on-state decreases, or images become faint.

Furthermore, when a color filter having a low light transmittance is used, images become dark due to low brightness, and the number of backlights, which are light sources, should be increased to brighten the images. For this reason, the consumption of power may be increased.

As a green pigment for a color filter, a phthalocyanine-based compound is preferably used. The phthalocyanine-based compound may be C.I. pigment green (hereinafter referred to as PG7, PG36 or PG58). Furthermore, when the color of the phthalocyanine-based compound differs from color characteristics required for a display device, a complementary yellow pigment, such as C.I. pigment yellow (hereinafter referred to as PY129 or PY139), may, if necessary, be used.

When the phthalocyanine-based compound, which is a generally known pigment, is used alone or in combination with a yellow pigment, a problem may arise in that the permittivity of a colored resin composition is increased due to the imbalance of intramolecular polarization of the green pigment and/or the yellow pigment. Another problem that may arise when the phthalocyanine-based compound is used alone or in combination with a yellow pigment is that a green-colored layer in a color filter formed from the composition is increased due to the imbalance of intramolecular polarization of the green pigment and/or the yellow pigment. When the permittivity of the green-colored layer increases, the electric field is distorted, resulting in a light leakage phenomenon in which a pixel corresponding to the green-colored layer is brighter than the surrounding pixels, and thus the output image is greenish.

Meanwhile, since the chromaticity coordinate or color gamut regions which are displayed by a color filter generally differ depending on the color coordinates and color loci thereof, pigments that are used in color filters for normal color gamut (NCG) and wide color gamut (WCG) may necessarily be binarized. Thus, there is a disadvantage in that, when a product model is changed, the composition of a colored resin composition (i.e., photoresist) itself should also be changed, resulting in a decrease in productivity.

Accordingly, there is a need to develop a colorant that can reduce the permittivity of a green-colored layer while unifying pigments that are used for color filters for normal color gamut and wide color gamut.

SUMMARY OF THE INVENTION

The present invention has been made in order to solve the above-described problems. An object of the present invention is to provide a novel reddish-yellow pigment contained in a colorant, and to provide a colorant comprising a combination of novel pigments, which reduces the imbalance of polarization caused by pigments.

Another object of the present invention is to provide a colorant that achieves a color filter for wide color gamut (WCG) and normal color gamut (NCG), even when the colorant is used in amounts smaller than a conventional colorant or even when a colored layer having a thinner thickness is formed using the colorant.

Still another object of the present invention is to provide a colored resin composition having reduced permittivity resulting from a combination of novel pigments including a novel reddish-yellow pigment contained in a colorant, and a color filter formed using the colored resin composition.

To achieve the above objects, in accordance with one aspect of the present invention, a color filter may be provided which has excellent optical characteristics resulting from a colorant composed of a combination of new pigments including a novel reddish-yellow pigment, which makes it possible to change the color gamut by merely adjusting the thickness of a colored layer, and a display device comprising the color filter.

Specifically, in accordance with one aspect of the present invention, a colorant is provided comprising a first pigment represented by the following Formula 1; a second pigment represented by the following Formula 2; and a third pigment represented by the following Formula 3:

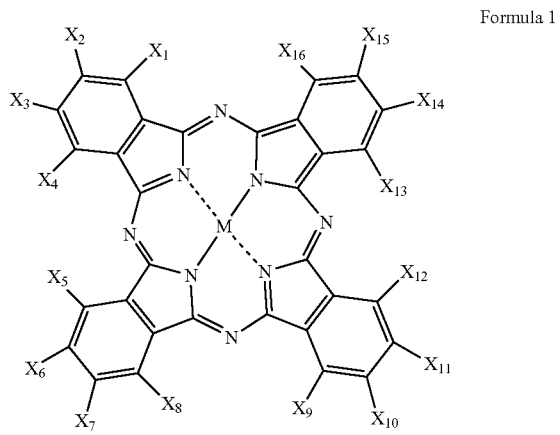

Formula 1 wherein M is Zn, Mg, Al, Si, Ti, V, Mn, Fe, Co, Ni, Ge, Sn or Cu, and $X_1$ to $X_{16}$ are each independently are chlorine (Cl) or bromine (Br);

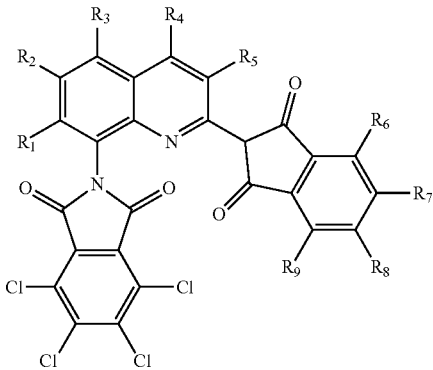

Formula 2 wherein $R_1$ to $R_9$ are each independently hydrogen, hydroxy, cyano or halogen;

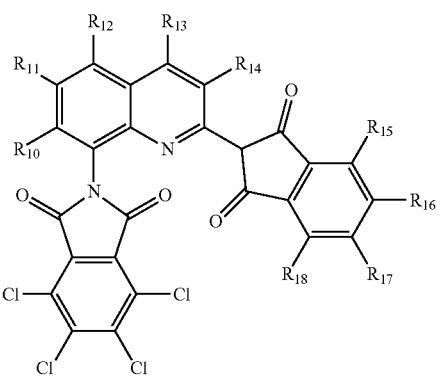

Formula 3 wherein $R_{10}$ to $R_{18}$ are each independently hydrogen, hydroxy, cyano or halogen, and any adjacent two of $R_{15}$ to $R_{18}$ are linked to each other to form a substituted aromatic ring or an unsubstituted aromatic ring.

In particular, a preferred compound that is used as the third pigment may be represented by the following Formula 4:

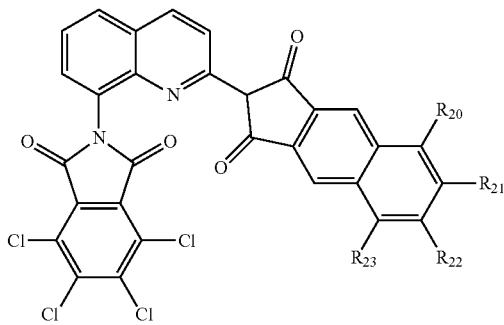

Formula 4 wherein $R_{20}$ to $R_{23}$ are each independently selected from hydrogen, hydroxy, cyano, halogen, substituted or unsubstituted $C_1$-$C_{19}$ alkyl, substituted $C_2$-$C_{10}$ alkenyl, unsubstituted $C_2$-$C_{10}$ alkenyl, substituted $C_1$-$C_{10}$ alkoxy or unsubstituted $C_1$-$C_{10}$ alkoxy.

The colorant according to the present invention comprises a combination of a first pigment as a green pigment, a second pigment as a yellow pigment and a third pigment as a reddish yellow pigment. The combination of the first pigment, the second pigment and the third pigment achieves a green-colored layer in a color filter, which satisfies chromaticity coordinates corresponding to both normal color gamut and wide color gamut features.

Furthermore, the third pigment can reduce the electric field distortion that may be caused by the first pigment and/or the second pigment. Accordingly, the third pigment may prevent an increase in the permittivity of a green-colored composition and a green-colored layer formed from the composition, thereby reducing the possibility of occurrence of a light leakage phenomenon in which a pixel corresponding to the green-colored layer is brighter than the surrounding pixels. Thus, the output image is greenish.

In accordance with another aspect of the present invention, there may be provided: a colored resin composition comprising the above-described colorant, a binder resin and a solvent; and a color filter comprising a green-colored layer formed from the composition.

DESCRIPTION OF EMBODIMENTS

Hereinafter, a colorant, a colored resin composition and a color filter according to various aspects of the present invention will be described in detail.

Colorant

In accordance with one aspect of the present invention, there is provided a colorant comprising a first pigment represented by the following Formula 1, a second pigment represented by the following Formula 2, and a third pigment represented by the following Formula 3. The first pigment represented by the following Formula 1 is a phthalocyanine-based green pigment:

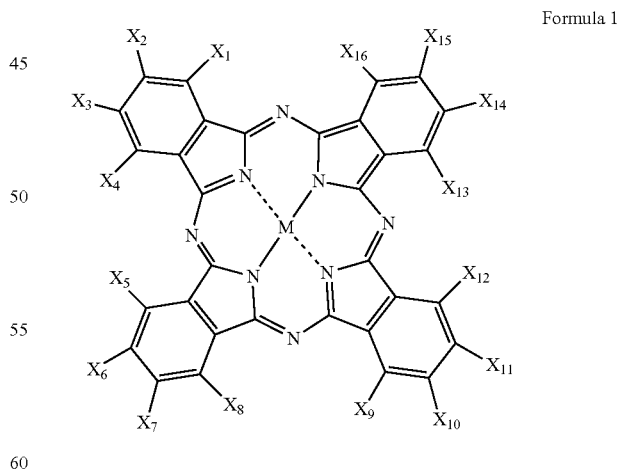

Formula 1 wherein M is the central metal element of the phthalocyanine-based green pigment, which may be Zn, Mg, Al, Si, Ti, V, Mn, Fe, Co, Ni, Ge, Sn or Cu.

As the central metal element, zinc is preferably used so that the colorant exhibits an excellent coloring ability and light transmittance. Also, zinc is preferably used so that the colorant displays chromaticity coordinates corresponding to both normal color gamut and wide color gamut, which are desired in the present invention.

Zinc phthalocyanine has up to 16 hydrogen atoms in one molecule. Thus, when the hydrogen atom of the zinc phthalocyanine is substituted with chlorine (Cl) or bromine (Br), 136 zinc phthalocyanine derivatives containing 0 to chlorine atoms, 0 to 16 bromine atoms and 0 to 16 hydrogen atoms may be theoretically obtained. Among them, zinc phthalocyanine substituted with at least one bromine atom displays chromaticity coordinates corresponding to normal color gamut and wide color gamut, which are desired in the present invention.

Specifically, it is preferred that $X_1$ to $X_{16}$ in the first pigment, which is used in an embodiment of the present invention, be each independently a halogen selected from among chlorine (Cl) and bromine (Br). Such halogenated zinc phthalocyanine may be synthesized using, as a starting material, phthalic acid or phthalodinitrile in which a portion or the whole of the aromatic ring is substituted with bromine or chlorine.

Furthermore, a halogenated zinc phthalocyanine substituted with chlorine and bromine at a constant ratio in one molecule may be less influenced by the surrounding charge because a relatively strong C—Br covalent bond is present therein, even when a relatively weak C—Cl covalent bond is broken by external energy or the like.

However, when $X_1$ to $X_{16}$ are all chlorine, like PG7, the C—Cl covalent bonds are likely to be broken by external energy or the like, and Cl⁻ ions released due to the breakage may influence the surrounding charge environment which cause problems, such as liquid crystal contamination or light leakage.

Thus, the first pigment represented by Formula 1 in the present invention is preferably a halogenated zinc phthalocyanine which contains Zn as a central metal, provided that at least 8 of $X_1$ to $X_{16}$ are bromine.

The second pigment represented by the following Formula 2 and the third pigment represented by the following Formula 3 are complementary color pigments in which the second pigment is yellow and the third pigment is reddish yellow:

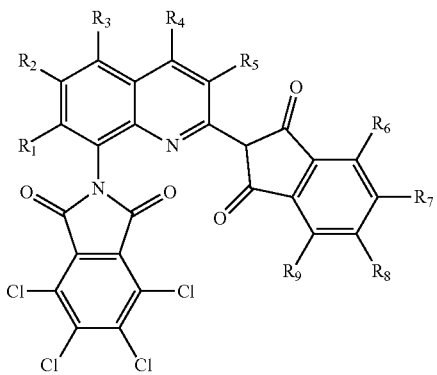

Formula 2 wherein $R_1$ to $R_9$ are each independently hydrogen, hydroxy, cyano or halogen.

As used herein, the term "halogen" refers to a group 17 element such as fluoro (—F), chloro (—Cl), bromo (—Br) or iodo (—I).

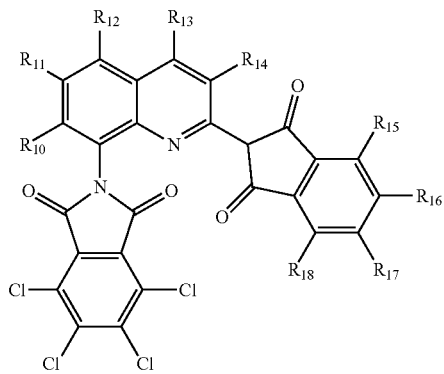

Formula 3 wherein $R_{10}$ to $R_{18}$ are each independently hydrogen, hydroxy, cyano or halogen, and any two adjacent two of $R_{15}$ to $R_{18}$ are linked to each other to form a substituted aromatic ring or an unsubstituted aromatic ring.

As used herein, the expression "any two adjacent two of $R_{15}$ to $R_{18}$ are linked to each other to form a substituted aromatic ring or an unsubstituted aromatic ring" means that the atom(s) of two substituents and atom(s) to which the two substituents are coupled are linked to each other to form a substituted aromatic ring or an unsubstituted aromatic ring. Herein, the aromatic ring may be a benzene ring or a heteroaromatic ring containing at least one heteroatom selected from among nitrogen, oxygen and sulfur atoms. Preferably, the aromatic ring is a benzene ring.

For example, the third pigment may be represented by any one of the following 1-a, 1-b and 1-c. More preferably, the third pigment is 1-b (hereinafter referred to as Formula 4):

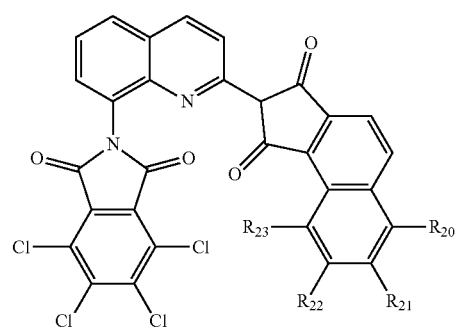

1-a

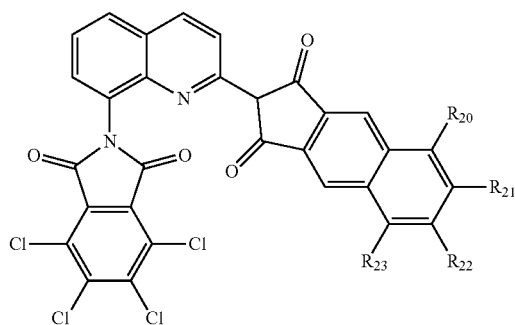

1-b

-continued

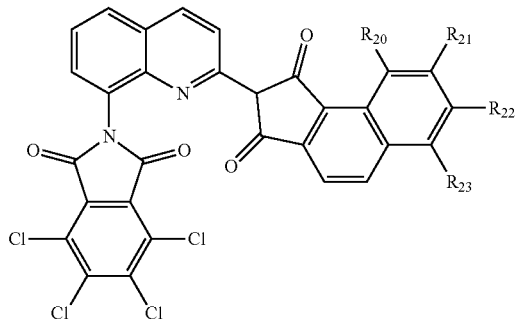

1-c wherein $R_{20}$ to $R_{23}$ are each independently selected from among hydrogen, hydroxy, cyano, halogen, substituted $C_1$-$C_{19}$ alkyl, unsubstituted $C_1$-$C_{19}$ alkyl, substituted $C_2$-$C_{10}$ alkenyl, unsubstituted $C_2$-$C_{10}$ alkenyl, and substituted $C_1$-$C_{10}$ alkoxy or unsubstituted $C_1$-$C_{10}$ alkoxy.

The third pigment is a reddish yellow pigment having excellent heat resistance and light resistance. Particularly, any adjacent two of $R_{15}$ to $R_{18}$ in Formula 3 are linked to each other to form a substituted aromatic ring or an unsubstituted aromatic ring, thereby increasing the density of electrons in the pigment molecule and enabling the third pigment to have a longer spectral wavelength band compared to a conventional yellow pigment.

The third pigment makes it possible to increase the coloring ability in a direction in which the color is transferred. Thus, even when a colorant comprising the third pigment, in addition to the first pigment and the second pigment, is used in amounts smaller than a conventional colorant or even when a colored layer having a thinner thickness is formed using the colorant, it is possible to obtain sufficient color characteristics.

Furthermore, the use of the third pigment, which is reddish yellow, makes it possible to optimize the slope of the line between the chromaticity coordinates of the colorant to obtain a green-colored layer displaying chromaticity coordinates corresponding to both normal color gamut and wide color gamut.

As used herein, the term "$C_a$-$C_b$ functional group" refers to a group having carbon atoms that are "a" to "b" in number. It should be understood that the definition of functional groups in the present invention includes not only the functional groups represented by specific formulas in the present invention, but also functional groups falling within the range of organic chemical knowledge of the technical field to which the present invention pertains.

For example, "$C_a$-$C_b$ alkyl" means saturated aliphatic groups, including straight-chain alkyl and branched-chain alkyl, which have "a" to "b" carbon atoms. A straight or a branched chain alkyl has, in its main chain, 10 or less carbon atoms (e.g., $C_1$-$C_{10}$ straight-chain, or $C_3$-$C_{10}$ branched chain), preferably 4 or less carbon atoms, more preferably 3 or less carbon atoms.

Specific examples of alkyl include methyl, ethyl, n-propyl, iso-propyl, n-butyl, sec-butyl, iso-butyl, tert-butyl, pent-1-yl, pent-2-yl, pent-3-yl, 3-methylbut-1-yl, 3-methylbut-2-yl, 2-methylbut-2-yl, 2,2,2-trimethyleth-1-yl, n-hexyl, n-heptyl and n-octyl.

Furthermore, "heteroalkyl" means an alkyl in which any carbon atom(s) other than terminal carbon atoms in the straight chain or branched chain of alkyl is(are) substituted with a heteroatom selected from among oxygen, nitrogen or sulfur.

"Alkenyl" or "alkynyl" refers to a functional group containing an unsaturated carbon-carbon bond in which alkenyl contains a double bond, and alkynyl contains a triple bond. Herein, the $sp^2$-hybridized carbon of alkenyl or the sp-hybridized carbon of alkynyl may be bonded directly to the parent chain or bonded indirectly to the parent chain via the $sp^3$-hybridized carbon of alkyl bonded to the $sp^2$-hybridized carbon of alkenyl or the sp-hybridized carbon of alkynyl.

As used herein, the term "alkoxy" means both an —O-(alkyl) group and an —O-(unsubstituted cycloalkyl) group, which are straight or branched-chain alkyl groups having one or more ether groups and 1 to 10 carbon atoms.

Specifically, examples of alkoxy include, but are not limited to, methoxy, ethoxy, propoxy, isopropoxy, n-butoxy, tert-butoxy, sec-butoxy, n-pentoxy, n-hexoxy, 1,2-dimethylbutoxy, cyclopropyloxy, cyclobutyloxy, cyclopentyloxy, cyclohexyloxy and the like.

In addition to the above-described functional groups, "$R_{20}$ to $R_{23}$ functional group" may be a functional group selected from among $C_1$-$C_{10}$ heteroalyl, $C_1$-$C_{10}$ haloalkyl and $C_1$-$C_{10}$ aminoalkyl.

"Haloalkyl" or "aminoalkyl" means a functional group in which at least one hydrogen atom bonded to the carbon atom thereof is substituted with halogen or amino. The amino of aminoalkyl may be —$NH_2$ or may have a structure in which at least one of two hydrogen atoms bonded to nitrogen is substituted with alkyl.

"Haloalkyl" refers to —$CH_2X$, —$CHX_2$ or —$CX_3$, which is a methyl group in which at least one of the hydrogen atoms thereof is substituted with halogen. Specific examples of haloalkyl include, but are not limited to, trifluoroalkyl, trichloromethyl, tribromomethyl and triiodomethyl.

"Heteroalkyl" means an alkyl group in which any carbon atom(s) other than terminal carbon atoms in the straight chain or branched chain thereof is (are) substituted with a heteroatom selected from among oxygen, nitrogen and sulfur.

Colored Resin Composition

In accordance with another aspect of the present invention, there is provided a colored resin composition comprising: (A) a colorant comprising the first pigment represented by Formula 1, the second pigment represented by Formula 2, and the third pigment represented by Formula 3; (B) a solvent; and (C) a binder resin.

The colorant that is used in the present invention comprises the first pigment represented by Formula 1, the second pigment represented by Formula 2, and the third pigment represented by Formula 3, and a coating layer or color-coated layer formed using a colored resin composition comprising this colorant may have a permittivity of 4.0 or less as measured at 100 Hz.

Furthermore, the colored resin composition according to an embodiment of the present invention enables the structural and electrical characteristics of the third pigment to prevent electric field distortion from being caused by the imbalance of the intramolecular polarization of the first pigment and/or the second pigment, thereby reducing the light leakage phenomenon in which a pixel corresponding to the green-colored layer is brighter than the surrounding pixels. Thus, the output image is greenish.

Furthermore, since the third pigment is structurally similar to the second pigment, a colored resin composition exhibits chromaticity coordinates similar to those of a colored resin composition comprising only the first pigment and the second pigment.

In addition, since the third pigment has excellent coloring ability compared to the second pigment, the use of the third pigment in combination with the first pigment and the second pigment makes it possible to increase the coloring ability of the colorant. This makes it possible to obtain sufficient color characteristics even when the colorant is used in amounts smaller than a conventional colorant or even when a colored layer having a thinner thickness is formed using the colorant.

In addition, the use of the third pigment, which is reddish yellow, makes it possible to optimize the slope of the line between the chromaticity coordinates of the colorant. Thus, the use of the third pigment can provide a colored resin composition making it possible to obtain a green-colored layer that satisfies chromaticity coordinates corresponding to normal color gamut and wide color gamut.

The content of the colorant (A) in the colored resin composition according to an embodiment of the present invention is preferably 5 to 50 wt % (on a solids basis). As used herein, the term "solids" refers to the remaining components other than the pigment dispersing agent and the solvent in the colored resin composition. If the content of the colorant (A) is less than 5 wt %, the color density may be insufficient, or the mechanical strength of the color filter pattern may be insufficient. On the other hand, if the content of the colorant (A) is more than 50 wt %, the viscosity of the colored resin composition may be increased, and thus the reliability of a resist process performed using the composition may be reduced.

Regarding the contents of the first pigment, the second pigment and the third pigment in the colorant (A) that is used in an embodiment of the present invention, the ratio of the mass of the green pigment to the mass of the yellow pigments (the first pigment/the second pigment and the third pigment) is preferably 1.5 or less, more preferably 0.8 or less. In this case, the coloring ability of the green-colored layer can further be increased.

The colorant (A) that is used in an embodiment of the present invention may further comprise, as a fourth pigment, at least one yellow pigment in order to change or complement the color characteristics. The at least one yellow pigment is at least one selected from PY1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 126, 127, 128, 129, 138, 139, 150, 151, 152, 153, 154, 155, 156, 161, 162, 164, 166, 167, 168, 169, 170, 171, 172, 173, 174, 175, 176, 177, 179, 180, 181, 182, 185, 187 and 199. However, the fourth pigment may cause stacking between the pigments. For this reason, when the colorant contains the fourth pigment, the content of the fourth pigment is preferably 5 parts by weight or less (on a solids basis) based on 100 parts by weight of the sum of the second pigment and the third pigment.

The solvent (B) that is used in the colored resin composition according to an embodiment of the present invention is a component that functions as a dispersion medium to disperse the pigments (A) and functions as a solvent capable of dissolving the binder resin.

Solvents that may be used in the present invention include water-soluble solvents and non-water soluble solvents.

Examples of the water-soluble solvents generally include compounds containing a highly hydrophilic group, such as a hydroxyl group, compounds containing a polyglycol backbone, etc.

Specific examples of the water-soluble solvents include $C_1$-$C_4$ alkyl alcohols, such as ethanol, methanol, butanol, propanol or isopropanol; glycol ethers, such as ethylene glycol monomethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-tert-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, or dipropylene glycol mono-n-butyl ether; formamide, acetamide, dimethyl sulfoxide, sorbitol, sorbitan, acetin, and sulforane.

In addition, a high-boiling point water soluble solvent having a boiling point of 180° C. or higher may be used in the present invention in order to prevent a decrease in storage stability, such as the change in viscosity by evaporation of the solvent in the colored resin composition.

Specific examples of water soluble solvents having a boiling point of 180° C. or higher include ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monomethyl ether, diethylene glycol monomethyl ether, tripropylene glycol, polyethylene glycol having a molecular weight of 2000 or less, 1,3-propylene glycol, isopropylene glycol, isobutylene glycol, 1,4-butanediol, 1,3-butanediol, 1,5-pentanediol, 1,6-hexanediol, glycerin, methylerythritol, pentaerythritol, 1,3-butylene glycol diacetate, and diethylene glycol butyl ether.

Examples of non-water-soluble solvents that may be used in the present invention include ester-based solvents, ether-based solvents, ketone-based solvents, etc.

Specific examples of ester-based solvents include methylether acetate, ethylether acetate, n-butylether acetate, isobutyl acetate, isopropylether acetate, 3-methoxybutylehter acetate, ethylene glycol acetate, propylene glycol monomethyl ether acetate, propylene glycol monomethyl ether acetate, 3-methyl-3-methoxybutyl ether acetate, monochloromethyl ether acetate, monochloroethyl ether acetate, monochlorobutyl ether acetate, butyl carbitol acetate, ethyl-3-ethoxy propionate, ethylene glycol monobutyl ether acetate, ethylene glycol monomethyl ether acetate, and propyl ether acetate.

Specific examples of ether-based solvents include ethylene glycol monohexyl ether, ethylene glycol-2-ethylhexylether, ethylene glycol phenyl ether, diethylene glycol-n-hexyl ether, diethylene glycol-2-ethylhexyl ether, propylene glycol monobutyl ether, dipropylene glycol monobutyl ether, dipropylene glycol propyl ether, and propylene glycol methyl ether propionate.

Examples of ketone-based solvents include methyl ethyl ketone, methyl isobutyl ketone, diisobutyl ketone, acetyl acetone, isophorone, acetophenone, and cyclohexanone.

In addition, the colored resin composition may further comprise a dispersing agent.

The dispersing agent is a component contributing to further increasing the dispersibility of the pigments of the colorant (A) in the colored resin composition. When the colored resin composition further comprises the dispersing agent, it is possible to ensure the excellent dispersibility of the pigments of the colorant (A) and to improve the dispersion stability and storage stability of the colored resin composition.

Dispersing agents that may be used in the present invention include a dispersing agent having a certain acid value, and a dispersing agent having a certain amine value. The acid-value dispersing agent and the amine-value dispersing agent may be used alone, but are preferably used in combination. In addition, a compound having both an acid value and an amine value may also be used alone.

Herein, the acid value of the acid-value dispersing agent is preferably 1 to 350 KOH mg/g as a solids basis, and the amine value of the amine-value dispersing agent is preferably 1 to 200 KOH mg/g. When a compound having both an acid value and an amine value is used alone, it is preferable in terms of the dispersibility of the pigments that the acid value be lower than the amine value. For example, when the acid value is 1 to 20 KOH mg/g, the amine value is preferably 30 to 50 KOH mg/g.

The colored resin composition according to the present invention further comprises a binder resin (C) in addition to a pigment dispersion. In addition, the colored resin composition may further comprise a polymerizable monomer together with the binder resin (C).

The binder resin functions as a support in the colored resin composition according to the present invention and serves to form a photoresist by a reaction with light in an exposure process. In one embodiment, the binder resin includes an acrylic binder resin that can adjust the flowability of the finally formed color filter pattern and that can form a binder by introduction of various monomers depending on the intended use, and/or a cardo-based binder resin having an excellent ability to control the developability of the color filter pattern by adjusting the acid value.

For example, the acrylic binder resin that is used in the present invention may be an acrylic binder resin that is soluble in an alkali which is used as a developer. Preferably, as the acrylic binder resin, a copolymer of a photopolymerizable monomer having an acidic functional group with other monomer copolymerizable with the photopolymerizable monomer may be used, thereby further increasing the strength of photoresist. In addition, it is preferable to use an acrylic binder resin containing a fluoro group, which can exhibit hydrophobicity when forming a cured photoresist layer. In this case, an alkali-soluble acrylic binder resin may be used alone. However, when the alkali resistance of a cured photoresist layer needs to be increased, a binder resin having an epoxy group may be used in combination with the acrylic binder resin.

Meanwhile, in addition to the alkali-soluble acrylic binder resin as described above, a cardo-based binder resin may be used which can easily control pattern developability by adjusting the acid value and which is compatible with the pigments and makes it possible to obtain high sensitivity.

The cardo-based binder resin refers to an acrylate-based binder resin containing a halogen such as fluorine in its main chain.

In addition, the weight-average molecular weight of the binder resin may be in the range of 1,000 to 200,000. If the weight-average molecular weight of the binder resin is less than 1,000, the binder may have a weak ability to bind the components with each other, and a color filter pattern may be lost in a development process, indicating that desired physical properties cannot be satisfied. On the other hand, if the weight-average molecular weight of the binder resin is more than 200,000, development by an alkali developer may hardly occur, so that the efficiency of the development process may be reduced, and the flowability of a color filter pattern may also be reduced, making it difficult to ensure the uniformity of pattern thickness.

The alkali-soluble binder resin and/or the cardo-based binder resin, which forms a photoresist support for the colored resin composition according to the present invention, may be contained in an amount of 30 to 50 wt %, preferably 35 to 45 wt %, on a solids basis. If the content of the binder resin is lower than the lowest limit of the above-specified range, the ability of the pigments to coat a substrate may be reduced. If the content of the binder resin is higher than the upper limit of the above-specified range, cured photoresist may not have desired optical properties. For example, when the cardo-based binder resin is used, the content of the binder resin should be within the above-described range, so that hydrophobic photoresist, pattern developability, coatability and dispersion stability can be achieved.

Meanwhile, the polymerizable monomer that is used in the present invention forms a polymer by a polymerization reaction initiated by radicals formed from a photopolymerization initiator by light irradiation in an exposure process, thereby forming a photoresist layer. Thus, the polymerizable monomer may be, for example, a monomer that can be polymerized into a binder resin by a radical polymerization reaction caused by light irradiation.

Furthermore, the polymerizable monomer may be a monomer capable of copolymerizing with the binder resin. For example, when the binder resin used is an alkali-soluble acrylic binder resin, an acid group-containing monomer and other monomer capable of copolymerizing the acid group-containing monomer may be used. Examples of acid group-containing acrylic monomers include acrylic acid, methacrylic acid, crotonic acid, itaconic acid, maleic acid, fumaric acid, monomethyl maleate, isoprene sulfonate, styrene sulfonate, and combinations thereof.

Additionally, the polymerizable monomer may include a functional monomer having an ethylenically unsaturated double bond. The functional monomer having an ethylenically unsaturated double bond may preferably include a multifunctional monomer having an ethylenically unsaturated double bond, which can form a photoresist phase by light irradiation.

Non-limiting examples of the functional monomer having an ethylenically unsaturated double bond include monofunctional monomers, such as ethylene glycol monoacrylate, ethylene glycol monomethacrylate, propylene glycol monoacrylate, propylene glycol monomethacrylate, phenoxyethyl acrylate and phenoxyethyl methacrylate; ethylene glycol diacrylate, triethylene glycol diacrylate, 1,4-bitanedoil diacrylate, 1,4-butanediol dimethacrylate, 1,6-hexanediol diacrylate, 1,6-hexanediol dimethacrylate, ethylene glycol dimethacrylate, triethylene glycol dimethacrylate, propylene glycol dimethacrylate, pentaerythritol diacrylate, pentaerythritol triacrylate, pentaerythritol trimethacrylate, pentaerythritol tetramethacrylate, dipentaerythritol diacrylate, dipentaerythritol triacrylate, dipentaerythritol pentaacrylate, dipentaerythritol hexaacrylate, dipentaerythritol hexamethacrylate, dipentaerythritol acrylate, neopentyl glycol diacrylate, tetraethylene glycol methacrylate, bisphenoxy ethyl alcohol diacrylate, trihydroxyethyl isocyanurate trimethacrylate, trimethylol propane triacrylate, trimethyl propane trimethacrylate, and combinations thereof. Particularly preferred are multifunctional monomers, such as pentaerythritol triacrylate, dipentaerythritol pentaacrylate and dipentaerythritol hexaacrylate.

In addition, when the alkali resistance of a cured photoresist layer needs to be improved, an ethylenically unsaturated monomer having a cyclic epoxy group may be used. The monomer having an epoxy group may be polymerized with a monomer having an acidic functional group and/or a functional monomer having an ethylenically unsaturated double bond.

Non-limiting examples of the monomer having an epoxy group include glycidyl acrylate, glycidyl methacrylate, glycidyl α-ethyl acrylate, glycidyl n-propyl acrylate, acrylic acid-3,4-epoxy butyl, methacrylic acid-3,4-epoxy butyl, acrylic acid-6,7-epoxy heptyl, methacrylic acid-6,7-epoxy heptyl, and vinyl benzyl glycidyl ether.

The polymerizable monomer that is used in the present invention may be contained in the colored resin composition in an amount of 30 to 50 wt %, preferably 35 to wt %, on a solids basis. When the content of the polymerizable monomer is within the above-specified range, it is possible to form a color filter pattern having a suitable level of mechanical strength by a radical crosslinking reaction initiated by, for example, UV light irradiation, and the ability of the polymerizable monomer to bind to the pigments may increase.

In addition, the colored resin composition according to the present invention may further comprise a photopolymerization initiator. The photopolymerization initiator forms radicals by light irradiation in an exposure process employing a photomask, and acts as an initiator for polymerization of the polymerizable monomer.

The photopolymerization initiator that is used in the present invention may be any compound capable of forming radicals by irradiation with light, such as UV light.

Non-limiting examples of the photopolymerization initiator include acetophenone-based compounds (e.g., 2,2'-diethoxyacetophenone, 2,2'-dibutoxyacetophenone, 2-hydroxy-2-methylpropiophenone, p-t-butyl trichloroacetophenone, p-t-butyl dichloroacetophenone, and 4-chloroacetophenone), benzophenone-based compounds (e.g., benzophenone, 4,4'-dimethylaminophenone, 4,4'-dichlorobenzophenone, 3,3'-dimethyl-2-methoxybenzophenone, 4-phenyl benzophenone, hydroxybenzophenone, and benzophenone acrylate), thioxanthone-based compounds (e.g., thioxanthone, 2-chlorothioxanthone, 2-methyl thioxanthone, isopropyl thioxanthone, and 2,4-diethyl thioxanthone), benzoin-based compounds (e.g., benzoin, benzoin methyl ether, benzoin ethyl ether, and benzoin isopropyl ether), triazine-based compounds containing monophenyl (e.g., 4,6-trichloro-s-triazine, 2-phenyl-4,6-bis(trichloromethyl)-s-triazine, and 2-(p-methoxyphenyl)-4,6-bis(trichloromethyl)-s-triazine), oxime-based compounds (e.g., 1-[9-ethyl-6-(2-methylbenzoyl)-9H-cabazol-3-yl]-1-(O-acetyloxime)ethanone, 1-[4-(phenylthio)phenyl]-2-(O-benzoyloxime)-1,2-octanedione), and the like.

The photopolymerization initiator for initiating a preferred level of photopolymerization may be contained in the colored resin composition in an amount of 0.1 to 10 wt % on a solids basis.

In other embodiments, when the polymerizable monomer that is used in the colored resin composition of the present invention is to be thermally polymerized, the colored resin composition may comprise a thermal polymerization initiator instead of the photopolymerization initiator. Specific examples of the thermal polymerization initiator include azo-based compounds, organic peroxides, and hydrogen peroxide.

Color Filter, Imaging Device and Display Device

In accordance with still another aspect of the present invention, there may be provided a color filter having a colored layer or pixels formed by curing of the above-described colored resin composition, and an imaging device or display device comprising the color filter.

Hereinafter, one example of a method for preparing a color filter according to the present invention will be described.

First, a black matrix is, if necessary, formed on the surface of a substrate so as to define a pixel region. Next, the colored resin composition according to the present invention is applied onto the substrate, and then pre-baked to evaporate the solvent, thereby forming a coating film. The coating film is exposed to light through a photomask, and developed with an alkaline developer. Then, the coating film is removed, and the substrate is post-baked, thereby forming a green pixel pattern. Red and blue pixel patterns may be formed using suitable colored resin compositions corresponding to the respective colors. As a result, a color filter having red, green and blue pixel patterns formed therein can be formed.

The substrate on which pixels are to be formed is not particularly limited, as long as it is transparent and has suitable strength. For example, the substrate may be made of polyester-based resin, polyolefinic resin, polycarbonate-based resin, acrylic resin, a thermoplastic resin sheet, an epoxy resin, thermosetting resin, or glass.

Furthermore, the surface of the substrate may optionally be pretreated. Examples of the pretreatment process include formation of a thin film using a silane coupling agent or urethane-based resin, corona discharge treatment, and ozone treatment.

The colored resin composition may be applied to the surface of the substrate by use of a spin-coating method, a wire-bar coating method, a flow coating method, a slit and spin coating method, a die coating method, a roll coating method or a spray coating method. The thickness of the coating film, which is the film thickness after drying, is generally 0.2 to 20 μm, preferably 0.5 to 10 μm, more preferably 0.8 to 5.0 μm. When the coating film is formed to have a thickness within the above-described thickness range, there are advantages in that gap adjustment in a pattern development or liquid crystal cell process is easy and a desired color is easily obtained.

Radiation that is used to form pixels may be, for example, visible light, ultraviolet light, far-ultraviolet light, electron rays, X-rays, or the like. Preferably, radiation light is used in the wavelength range of 190 to 450 nm. A light source that is used to obtain radiation having a wavelength of 190 to 450 nm is not particularly limited, and examples thereof include lamp light sources, such as xenone lamps, halogen lamps, tungsten lamps, high-pressure mercury lamps, ultrahigh-pressure mercury lamps, metal halide lamps, low-pressure mercury lamps, carbon arc lamps or fluorescent lamps, and laser light sources such as an argon ion laser, a YAG laser, an excimer laser, a nitrogen laser, a helium cadmium laser, a semiconductor laser or the like. In addition, an optical filter may be used to irradiate light having a specific wavelength.

Examples of an alkaline developer that may be used in the present invention include inorganic alkaline compounds, such as sodium hydroxide, potassium hydroxide, lithium hydroxide, sodium carbonate, potassium carbonate, sodium hydrogen carbonate, potassium hydrogen carbonate, sodium silicate, potassium silicate, sodium metasilicate, sodium phosphate, potassium phosphate, sodium hydrogen phosphate, potassium hydrogen phosphate, sodium dihydrogen phosphate, potassium dihydrogen phosphate or ammonium hydroxide; and organic alkaline compounds, such as mono-, di- or triethanolamine, mono-, di- or trimethylamine, mono-, di- or triethylamine, mono- or diisopropylamine, n-butyl amine, mono-, di- or triisopropanolamine, ethyleneimine, ethylenediamine or tetramethyl ammonium hydroxide.

In addition, if necessary, a water-soluble organic solvent, such as methanol or ethanol, or a surfactant may be added to the developer. Examples of the development method include a shower development method, a spray development method, a dip development method, a paddle development method and the like. The development process may be performed for, for example, 50 to 150 seconds. In addition, after the exposure and development processes, a rinse process for rinsing out the developer remaining on the pattern may be performed.

After completion of the development process, the substrate having a specific photoresist pattern may be subjected to a post-baking (hard baking or curing) process in which the photoresist is cured and crosslinked using a heating device, such as a hot plate or an oven. Accordingly, the crack resistance and solvent resistance of the photoresist pattern formed to correspond to the exposed region can further be increased. The post-baking process may be performed, for example, at a temperature of 200 to 250° C. for about 20 to 40 minutes.

The color filter prepared according to the above-described method may be used to provide colors to images that are displayed or generated by display devices, such as liquid crystal display devices or organic light-emitting display devices, or imaging devices.

EXAMPLES

Preparation of Colored Resin Compositions

As shown in Table 1 below, components are mixed with one another to prepare colored resin compositions (unit: parts by weight).

TABLE 1

|  |  | Example | | | | Comparative Example | |
|---|---|---|---|---|---|---|---|
|  |  | 1 | 2 | 3 | 4 | 1 | 2 |
| Colorant | 1-1 | — | 6 | — | 5 | 6.5 | — |
|  | 1-2 | 5 | — | 7.5 | — | — | 2.5 |
|  | 2-1 | 3 | — | — | 3 | 3.5 | 7.5 |
|  | 3-1 | 2 | 4 | 2.5 | 2 | — | — |
|  | 3-2 | — | — | — | — | — | — |
|  | 3-3 | — | — | — | — | — | — |
| Binder resin |  | 5.2 | | | | | |
| Polymerizable monomer |  | 2.3 | | | | | |
| Photopolymerization initiator |  | 3.1 | | | | | |
| Solvent |  | 41 | | | | | |

1-1: a Compound Represented by Formula 5

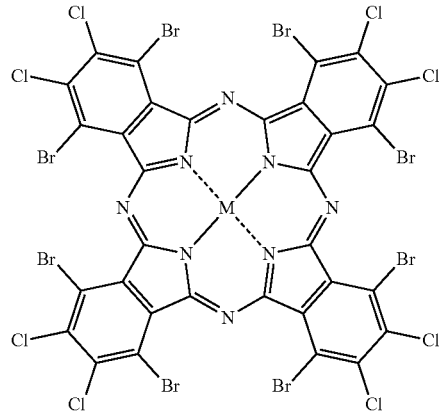

Formula 5

1-2: a Compound Represented by Formula 6

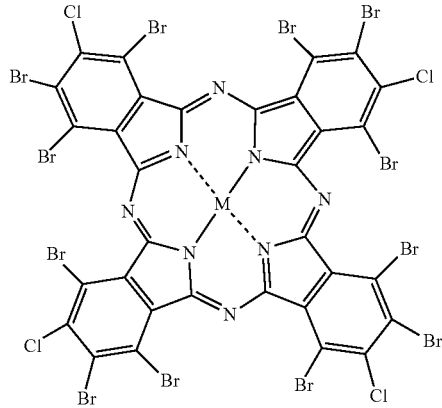

Formula 6

2-1: a Compound Represented by Formula 7

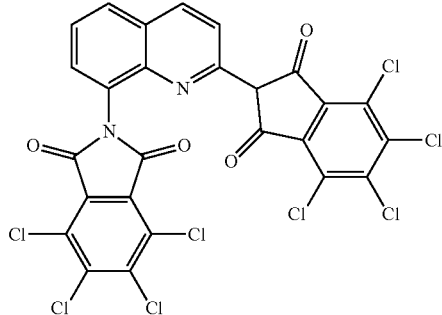

Formula 7

3-1: a Compound Represented by Formula 8

Formula 8

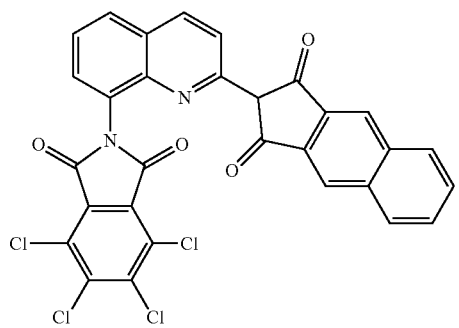

3-2: a Compound Represented by Formula 9

Formula 9

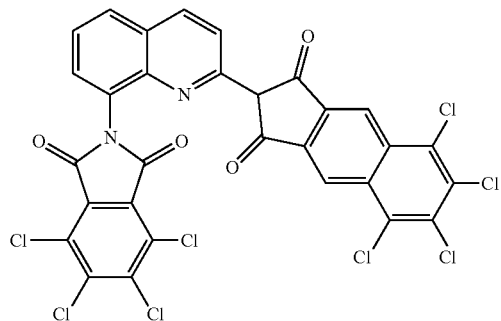

3-3: a Compound Represented by Formula 10

Formula 10

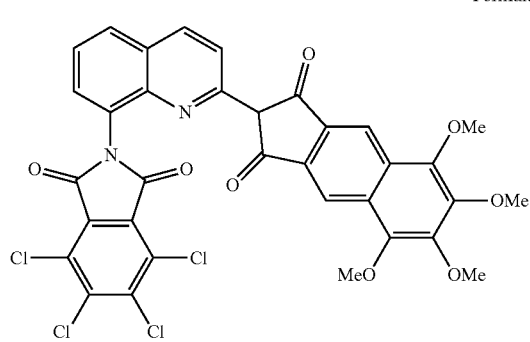

Binder resin: an alkali-soluble binder resin prepared by polymerizing methacrylic acid, benzyl methacrylate and styrene so as to have a molecular weight of 12,000.

Polymerizable monomer: dipentaerythritol hexaacrylate.

Photopolymerization initiator: 2,2'-diethoxyacetophenone.

Solvent: propylene glycol methyl ether acetate.

Preparation of Color Filter Pattern (Colored Layer)

Each of the colored resin compositions prepared according to the Examples and the Comparative Examples was spin-coated on a glass substrate, and then pre-baked at 90° C. for 100 seconds to form films. Each of the films was patterned by exposure to light at a dose of 40 mJ/cm² under a high-pressure mercury lamp through a photomask, and the pattern was developed in an alkaline aqueous solution of KOH (pH 11.3) for a predetermined time and washed with deionized water. Next, the pattern was post-baked at 230° C. for about 30 minutes, thereby forming color filter patterns having a COT (Color Filter on TFT) structure Evaluation of Electrical Properties of Color Filters The color filter patterns (green colored layers) resulting from post-baking were measured for their permittivity at 100 Hz, and the results of the measurements are shown in Table 2 below.

TABLE 2

|  | Example | | | | Comparative Example | |
|---|---|---|---|---|---|---|
|  | 1 | 2 | 3 | 4 | 1 | 2 |
| Permittivity | 3.83 | 3.91 | 3.84 | 3.89 | 4.22 | 4.376 |

From the results in Table 2 above, it can be seen that the permittivity of the green colored layer formed of each of the colored resin compositions prepared according to Examples 1 to 4 was lower than the permittivity of the green colored layer formed of each of the colored resin compositions prepared according to Comparative Examples 1 and 2.

Namely, it can be seen that the use of the novel third pigment according to the Examples of the present invention can reduce the imbalance of the intramolecular polarization of the first pigment and/or the second pigment, thereby preventing an increase in the permittivity of the green colored layer.

Thus, when a green colored layer is formed using the colored resin composition according to the present invention, it is possible to reduce the light leakage phenomenon in which a pixel corresponding to the green colored layer is brighter than the surrounding pixels due to electric field distortion. Thus, the output image is greenish.

Evaluation of Chromaticity Coordinates and Brightness of Color Filters

The chromaticity coordinates (F10 light source) and brightness (Y) of each of the color filter patterns (green colored layers) resulting from post-baking were measured using a color measurement system, and the results of the measurements are shown in Table 3 below.

TABLE 3

|  | Layer thickness | Chromaticity coordinates | | Brightness |  |
|---|---|---|---|---|---|
|  | μm | x | y | (Y) | Remarks |
| Example 1 | 1.9 | 0.282 | 0.562 | 64.23 | NCG |
|  | 2.9 | 0.264 | 0.605 | 56.13 | WCG |
| Example 2 | 1.9 | 0.287 | 0.555 | 63.90 | NCG |
|  | 2.9 | 0.267 | 0.605 | 56.00 | WCG |
| Example 3 | 1.9 | 0.301 | 0.575 | 66.10 | NCG |
|  | 2.9 | 0.286 | 0.615 | 58.90 | WCG |
| Example 4 | 1.9 | 0.288 | 0.564 | 65.10 | NCG |
|  | 2.9 | 0.273 | 0.607 | 57.40 | WCG |
| Comparative Example 1 | 2.5 | 0.283 | 0.573 | 55.37 | NCG |
|  | 2.9 | 0.262 | 0.605 | 54.66 | WCG |
| Comparative Example 2 | 2.3 | 0.278 | 0.559 | 55.83 | NCG |
|  | 2.8 | 0.273 | 0.598 | 54.21 | WCG |

From the results in Table 3 above, it can be seen that when the green colored layer is formed using the colored resin composition according to the present invention, it is possible to form both a colored layer for a color filter (1.9 μm) for normal color gamut (NCG) and a colored layer for a color filter (2.9 μm) for wide color gamut (WCG) by merely adjusting the layer thickness without changing the colorant contained in the colored resin composition.

Furthermore, referring to Comparative Examples 1 and 2, it can be seen that when the green colored layer is formed using the colored resin composition according to the present invention, the green colored layer can satisfy normal color gamut (NSG), even when it has a thinner thickness compared to that of the Comparative Examples. Thus, the present invention makes it possible to reduce the amount of colored resin composition used to form a color filter.

In addition, it can be seen that the brightness of the color filters for both normal color gamut (NCG) and wide color gamut (WCG), formed using the colored resin compositions of Comparative Examples 1 and 2, is lower than that of the color filters formed using the colored resin compositions of Examples 1 to 4.

As described above, according to the present invention, the imbalance of the intramolecular polarization of a green pigment and/or a yellow pigment can be reduced by using the colorant comprising the first pigment represented by Formula 1, the second pigment represented by Formula 2 and the third pigment represented by Formula 3. Accordingly, it is possible to obtain a color filter comprising a colored layer in which the light leakage phenomenon caused by the electric field phenomenon is reduced.

Furthermore, according to the present invention, it is possible to obtain a green-colored layer that can satisfy the normal color gamut, even when the colorant is used in amounts smaller than a conventional color, or even when a colored layer having a thinner thickness is formed.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A colorant comprising:

a first pigment represented by Formula 5 or Formula 6:

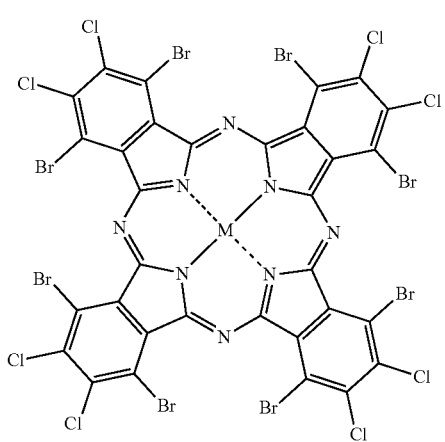

Formula 5 wherein M is Zn; or

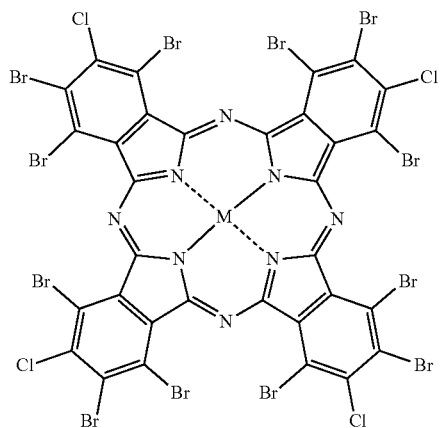

Formula 6 wherein M is Zn;

a second pigment represented by Formula 2:

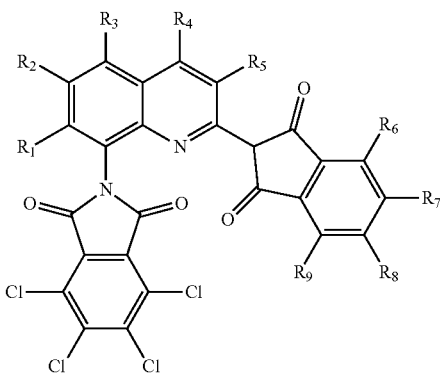

Formula 2 wherein $R_1$ to $R_9$ are each independently hydrogen, hydroxy, cyano or halogen; and a third pigment represented by Formula 3:

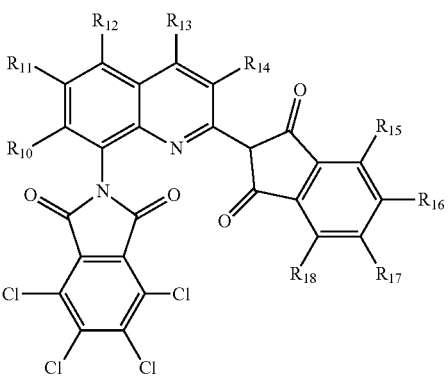

Formula 3 wherein $R_{10}$ to $R_{18}$ are each independently hydrogen, hydroxy, cyano or halogen, and any adjacent two of $R_{15}$ to $R_{18}$ are linked to each other to form a substituted aromatic ring or an unsubstituted aromatic ring.

2. The colorant of claim 1, wherein the third pigment is represented by Formula 4:

Formula 4

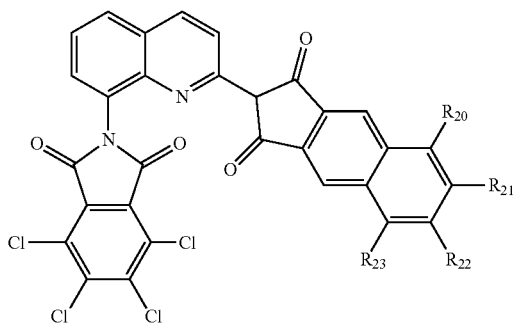

wherein $R_{20}$ to $R_{23}$ are each independently selected from hydrogen, hydroxy, cyano, halogen, substituted $C_1$-$C_{19}$ alkyl, unsubstituted $C_1$-$C_{19}$ alkyl, substituted $C_2$-$C_{10}$ alkenyl, unsubstituted $C_2$-$C_{10}$ alkenyl, substituted $C_1$-$C_{10}$ alkoxy or unsubstituted $C_1$-$C_{10}$ alkoxy.

3. The colorant of claim 1, wherein the aromatic ring is a benzene ring or a heteroaromatic ring containing at least one heteroatom selected from the group consisting of a nitrogen atom, an oxygen atom and a sulfur atom.

4. The colorant of claim 1, wherein the third pigment is represented by Formula 1-a:

Formula 1-a

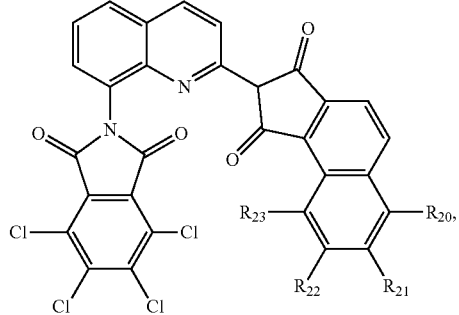

wherein $R_{20}$ to $R_{23}$ are each independently selected from hydrogen, hydroxy, cyano, halogen, substituted $C_1$-$C_{19}$ alkyl, unsubstituted $C_1$-$C_{19}$ alkyl, substituted $C_2$-$C_{10}$ alkenyl, unsubstituted $C_2$-$C_{10}$ alkenyl, substituted $C_1$-$C_{10}$ alkoxy or unsubstituted $C_1$-$C_{10}$ alkoxy.

5. The colorant of claim 1, wherein the third pigment is represented by Formula 1-c:

Formula 1-c

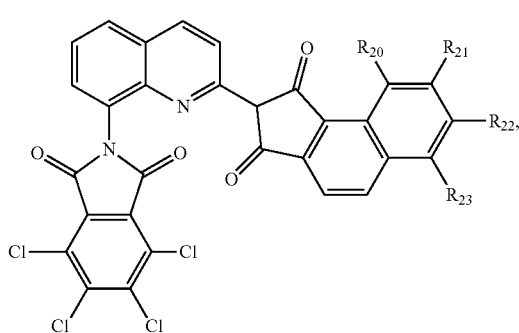

wherein $R_{20}$ to $R_{23}$ are each independently selected from hydrogen, hydroxy, cyano, halogen, substituted $C_1$-$C_{19}$ alkyl, unsubstituted $C_1$-$C_{19}$ alkyl, substituted $C_2$-$C_{10}$ alkenyl, unsubstituted $C_2$-$C_{10}$ alkenyl, substituted $C_1$-$C_{10}$ alkoxy or unsubstituted $C_1$-$C_{10}$ alkoxy.

6. A colored resin composition comprising:
(A) a colorant comprising a first pigment represented by Formula 1 Formula 5 or Formula 6:

Formula 5

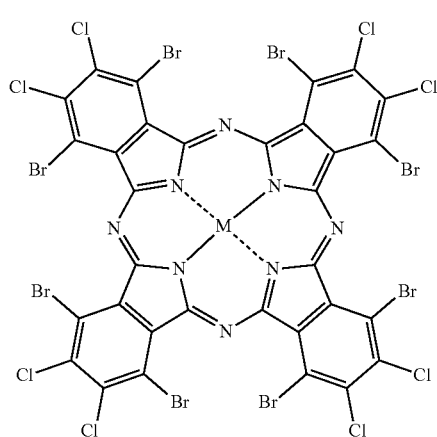

wherein M is Zn; or

Formula 6

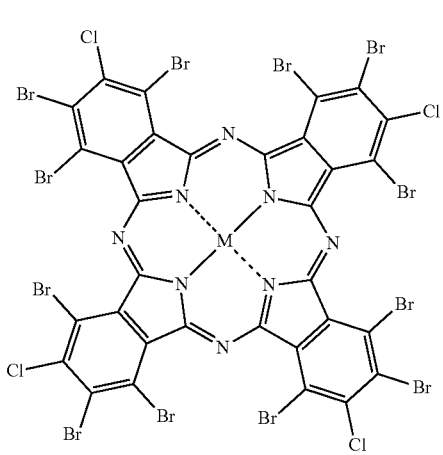

wherein M is Zn;
a second pigment represented by Formula 2:

Formula 2

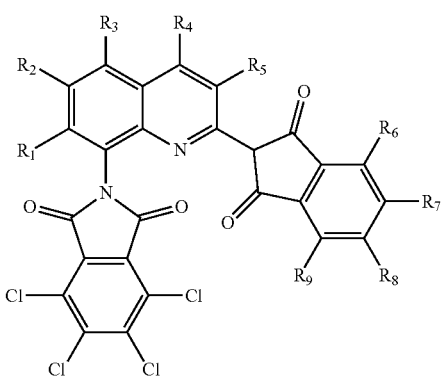

wherein $R_1$ to $R_9$ are each independently hydrogen, hydroxy, cyano or halogen; and a third pigment represented by Formula 3:

Formula 3

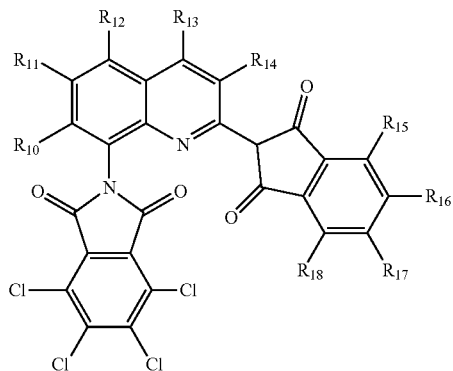

wherein $R_{10}$ to $R_{18}$ are each independently hydrogen, hydroxy, cyano or halogen, and any adjacent two of $R_{15}$ to $R_{18}$ are linked to each other to form a substituted aromatic ring or an unsubstituted aromatic ring;

(B) a binder resin; and (C) a solvent.

7. The colored resin composition of claim 6, wherein the third pigment is represented by Formula 4:

Formula 4

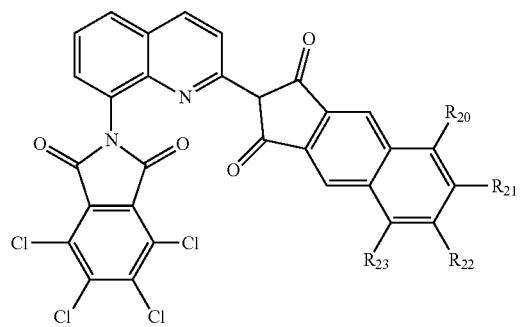

wherein $R_{20}$ to $R_{23}$ are each independently selected from hydrogen, hydroxy, cyano, halogen, substituted $C_1$-$C_{19}$ alkyl, unsubstituted $C_1$-$C_{19}$ alkyl, substituted $C_2$-$C_{10}$ alkenyl, unsubstituted $C_2$-$C_{10}$ alkenyl, substituted $C_1$-$C_{10}$ alkoxy or unsubstituted $C_1$-$C_{10}$ alkoxy.

8. The colored resin composition of claim 6, wherein the first pigment is represented by Formula 6:

Formula 6

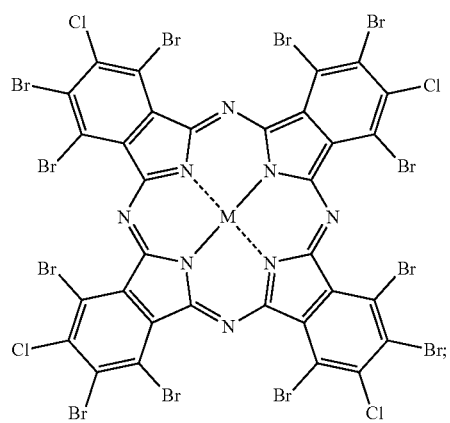

wherein the second pigment is represented by Formula 7:

Formula 7

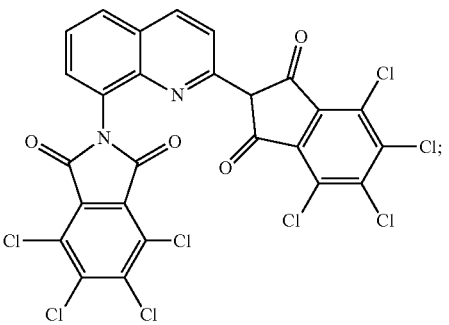

and wherein the third pigment is represented by Formula 8:

Formula 8

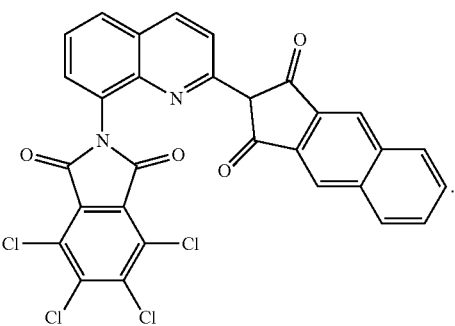

9. The colored resin composition of claim 6, wherein the first pigment is represented by Formula 5:

Formula 5

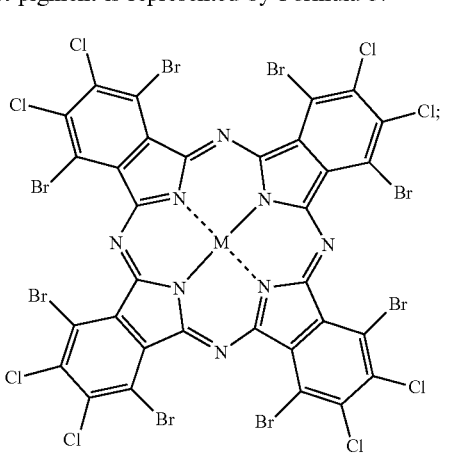

and wherein the third pigment is represented by Formula 8:

Formula 8

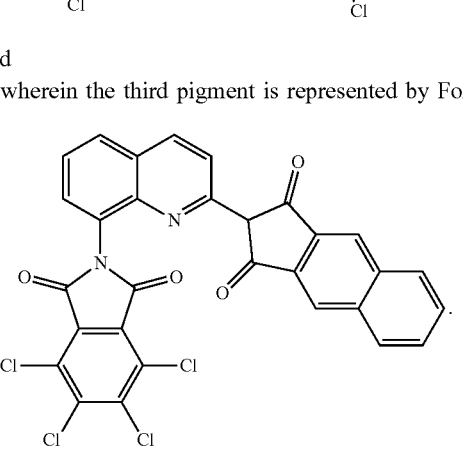

10. The colored resin composition of claim 6, wherein the first pigment is represented by Formula 6:

Formula 6

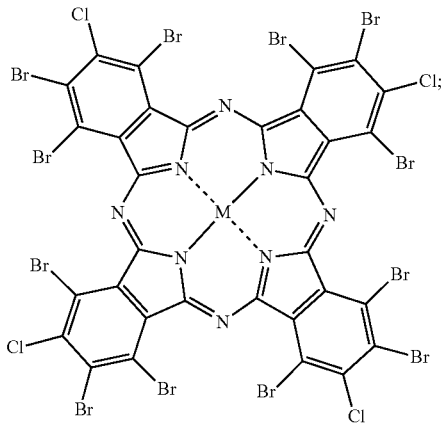

and
wherein the third pigment is represented by Formula 8:

Formula 8

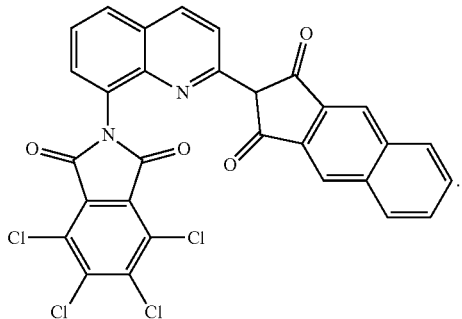

11. The colored resin composition of claim 6, wherein the first pigment is represented by Formula 5:

Formula 5

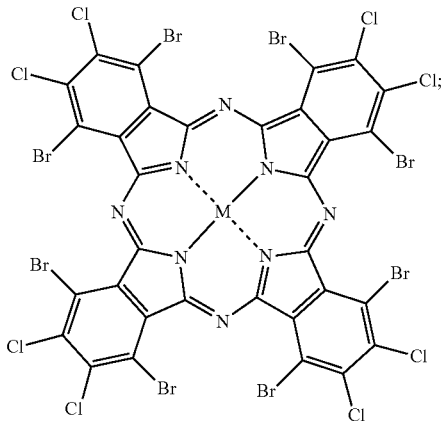

wherein the second pigment is represented by Formula 7:

Formula 7

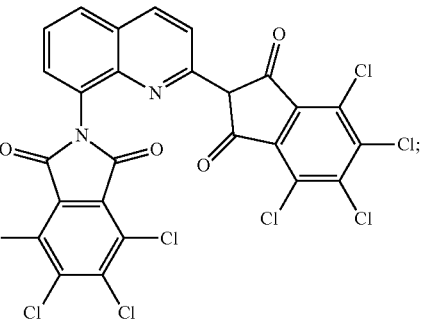

and
wherein the third pigment is represented by Formula 8:

Formula 8

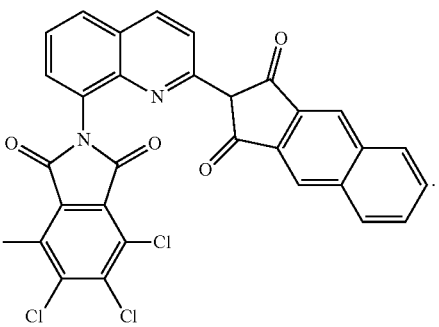

12. The colored resin composition of claim 6, wherein the colorant is in an amount of 5 to 50 wt %.

13. The colored resin composition of claim 6, further comprising a first dispersing agent having an acid value of 1 to 350 KOH mg/g as a solid basis, or a second dispersing agent having an amine value of 1 to 200 KOH mg/g.

14. The colored resin composition of claim 6, further comprising a first dispersing agent having an acid value of 1 to 350 KOH mg/g as a solid basis, and a second dispersing agent having an amine value of 1 to 200 KOH mg/g.

15. The colored resin composition of claim 6, wherein the binder resin is an acrylic binder resin or a cardo-based binder resin.

16. The colored resin composition of claim 15, wherein the acrylic binder resin contains a fluoro group.

17. The colored resin composition of claim 6, wherein the binder resin has a weight average molecular weight in a range of 1,000 to 200,000.

18. The colored resin composition of claim 6, wherein the binder resin is in an amount of 30 to 50 wt % on a solids basis.

* * * * *